United States Patent
Heusinger et al.

(10) Patent No.: US 9,573,682 B2
(45) Date of Patent: Feb. 21, 2017

(54) SYSTEM FOR A VEHICLE WITH REDUNDANT COMPUTERS

(71) Applicant: Airbus Defence and Space GmbH, Ottobrunn (DE)

(72) Inventors: Hugo Heusinger, Neuching (DE); Winfried Lohmiller, Freising (DE); Reinhard Reischl, Aying (DE); Gregor Jarasch, Ingolstadt (DE); Rosa Maria Delgado Romero, Getafe (ES)

(73) Assignees: Airbus Defence and Space GmbH, Ottobrunn (DE); EADS Construcciones Aeronauticas, SA, Madrid (ES)

( * ) Notice: Subject to any disclaimer, the term of this patent is extended or adjusted under 35 U.S.C. 154(b) by 0 days.

(21) Appl. No.: 14/668,408

(22) Filed: Mar. 25, 2015

(65) Prior Publication Data
US 2015/0274293 A1    Oct. 1, 2015

(30) Foreign Application Priority Data
Mar. 26, 2014 (EP) .................................. 14001107

(51) Int. Cl.
*B64C 15/00* (2006.01)
*B64D 1/04* (2006.01)
(Continued)

(52) U.S. Cl.
CPC ............ *B64C 39/024* (2013.01); *B64C 15/00* (2013.01); *G05D 1/0011* (2013.01);
(Continued)

(58) Field of Classification Search
CPC ........ B64C 15/00; B64D 1/04; G05D 1/0038; G05D 1/0088; G05D 1/0202; G08G 1/096805; H01H 59/0009; G01P 21/02
(Continued)

(56) References Cited

U.S. PATENT DOCUMENTS

| | | | |
|---|---|---|---|
| 5,717,302 A * | 2/1998 | Sakai | G01P 21/02 318/282 |
| 6,122,572 A * | 9/2000 | Yavnai | G05D 1/0088 342/13 |

(Continued)

OTHER PUBLICATIONS

English-language European Search Report dated Jan. 28, 2015 (seven (7) pages).
(Continued)

*Primary Examiner* — Yuri Kan
(74) *Attorney, Agent, or Firm* — Crowell & Moring LLP

(57) ABSTRACT

A control and/or management system for a vehicle includes at least one of: (A) at least two redundant vehicle management computers configured to generate system control commands for each maneuvering actuators and for each system actor based on the data acquired by the sensors; (B) at least two redundant remote interface units for interconnecting a sensor or a system actor with a vehicle management computer; (C) at least two redundant actuator control computers configured to generate control commands for each maneuvering actuator based on received maneuvering commands; and (D) a common interface for connecting an external computer, the common interface being directly connected to at least two redundant computers.

13 Claims, 2 Drawing Sheets

(51) Int. Cl.
*B64C 39/02* (2006.01)
*G05D 1/00* (2006.01)

(52) U.S. Cl.
CPC ...... *G05D 1/0077* (2013.01); *B64C 2201/141* (2013.01); *B64C 2201/146* (2013.01)

(58) Field of Classification Search
USPC ................ 701/23, 36, 466, 117, 301; 244/3; 361/31; 318/374
See application file for complete search history.

(56) References Cited

U.S. PATENT DOCUMENTS

| | | | | |
|---|---|---|---|---|
| 2008/0165457 | A1* | 7/2008 | Premerlani | ........ H01H 59/0009 361/31 |
| 2011/0024548 | A1* | 2/2011 | Kuroda | .................... B64D 1/04 244/3 |
| 2011/0035149 | A1* | 2/2011 | McAndrew | .......... G05D 1/0038 701/466 |
| 2011/0118980 | A1* | 5/2011 | Hoy | ..................... G05D 1/0202 701/301 |
| 2016/0189544 | A1* | 6/2016 | Ricci | ................ G08G 1/096805 701/117 |

OTHER PUBLICATIONS

A Study of a Reconnaissance Surveillance Vehicle, Oct. 20, 2013 (99 pages).
Y. C. Yeh, Triple-Triple Redundant 777 Primary Flight Computer, Aerospace Applications Conference, vol. 1, Feb. 3, 1996, pp. 293-307.

* cited by examiner

SYSTEM FOR A VEHICLE WITH REDUNDANT COMPUTERS

CROSS-REFERENCE TO RELATED APPLICATIONS

The present application claims priority under 35 U.S.C. §119 to European Application 14 001 107.3-1802, filed Mar. 26, 2014, the entire disclosure of which is herein expressly incorporated by reference.

FIELD OF THE INVENTION

Exemplary embodiments of the present invention relate to a control and/or management system for a vehicle and an unmanned aerial or ground vehicle.

BACKGROUND OF THE INVENTION

In particular, a long endurance unmanned aerial vehicle may have to be highly optimized with respect to its shape, weight, fuel consumption, etc. to achieve the required time on station. As a consequence there are only small control surfaces (such as ailerons and rudders) attached and there is only little space and limited electrical power available for the vehicle management, the system services, the communication and the mission avionics systems.

SUMMARY OF THE INVENTION

Exemplary embodiments are directed to reducing weight and power consumption and electronic system complexity of a vehicle, as well as providing a failsafe control and management system of a vehicle.

An aspect of the invention relates to a system for a vehicle. A vehicle may be a land, water or air based vehicle, such as a car, a tank, a ship, a submarine, an aircraft, etc. It has to be understood that a system may comprise all hardware and software components that are used for controlling the vehicle, such as actuators, sensors, computers, data network components, etc. The system may control inner system actors, such as pumps, generators, motors, valves, relays, etc. and/or outer maneuvering actuators, such as ailerons, rudders, wheels, etc.

According to an embodiment of the invention, the system comprises maneuvering actuators for maneuvering the vehicle (such as actuators adapted for moving control surfaces), system actors (such as valves, generators, motors, pumps, relays) for controlling inner components of the vehicle and sensors for acquiring data associated with the system actors and maneuvering actuators (such as position sensors, electrical sensors, temperature sensors, pressure sensors). A system sensor may be associated with a system actors and/or maneuvering actuators, when the system sensor acquires, senses or measures data/information that may be changed or manipulated by the respective actuator (such as a current after a relay, a position of a component moved by an electrical motor used as actuator, or the position of a valve).

Furthermore, the system comprises at least two redundant computers for controlling and/or managing the vehicle. The redundant computers may be vehicle management computers, remote interface units and/or actuator control computers.

According to an embodiment of the invention, the system comprises at least two redundant vehicle management computers communicatively interconnected with the maneuvering actuators, system actors and sensors, wherein a vehicle management computer is adapted for generating system control commands for the system actors such as valves, generators, motors, pumps and for generating maneuvering commands for the maneuvering actuators relays based on the data acquired by the sensors. A vehicle management computer may perform a calculation of vehicle management functions (such as flight control, flight guidance, autopilot, auto throttle, engine control, environmental control etc.) and/or system services (such as electrical power control, fuel management, wheel brake, etc.). A vehicle management computer may generate corresponding maneuvering commands (that may comprise position demands for control surfaces) and may forward them to an actuator control computer that may be used for controlling a maneuvering actuator (see below).

According to an embodiment of the invention, the system comprises at least two redundant remote interface units (remote from the respective vehicle management computer) for interconnecting a system sensor and/or a system actor with a vehicle management computer. Each vehicle management computer may receive data from system sensors via its connected remote interface units for example via dedicated data busses. Critical data may be sensed by multiple sensors which are connected to different remote interface units or alternatively via a direct connection. This may ensure that the corresponding data is received on at least two vehicle management computers via at least two remote interface units or via a direct connection.

A vehicle management computer may generate control commands and/or demands for other system actors (like switching on/off of pumps, opening/closing of valves, etc.) and may forward them to a remote interface unit which may drive the corresponding system actor. Alternatively, the vehicle management computer may drive the corresponding system actor directly.

According to an embodiment of the invention, the system comprises at least two redundant actuator control computers adapted for receiving maneuvering commands from at least two vehicle control computers. Each actuator control computer may be directly connected to only one vehicle management computer. For example, there may be the same number of actuator control computers as of vehicle management computers. The actuator control computers may be communicatively interconnected with each other. In the case when one vehicle management computer fails, maneuvering commands may be transmitted from the actuator control computer, which received these commands to the actuator control computer, which is connected to the failed vehicle management computer.

Each actuator control computer may be adapted for generating control commands for each maneuvering actuator based on the received maneuvering commands. The maneuvering actuators are adapted for moving control surfaces, for example an aileron, an elevator and/or a rudder. There may also be sensors associated with maneuvering actuators for determining the position of the control surface. Each actuator control computer may perform a loop closure with all maneuvering actuators by driving the corresponding actuator based on the position demand (maneuvering command) of the vehicle management computer and the sensed position of the control surface.

According to an embodiment of the invention, the system comprises a common interface, for example connecting an external computer or simple electronic hardware as switches and/or lamps. The common interface may be directly connected to at least two redundant computers. The common interface may be seen as a central hub, for example used for a maintenance activity in the aerial vehicle, for the vehicle management and system services provided by the system. The common interface may simplify maintenance procedures and thus may reduce maintenance costs.

For example, the common interface may be directly connected to at least two vehicle management computers.

For example, a collection of fault data from the system may be stored in the vehicle management computers and/or may be downloaded during ground operation to a ground control computer via the common interface. The ground control computer may also be used to start maintenance tests of the system. The vehicle management computers may issue corresponding commands to the affected actors of the system. The vehicle management computers may be seen as a further central hub in the vehicle for all maintenance activities.

According to an embodiment of the invention, each vehicle management computer is adapted for generating control commands for each system actor and/or each maneuvering actuator. In other words, when one of the vehicle control computers has a failure, one other vehicle control computer may take over the functionality for controlling specific system actors and/or maneuvering actuator that are usually controlled by the failed vehicle management computer.

Such a system with vehicle management computers providing a highly integrated vehicle management system combined with the relevant system services may reduce the weight, the required inboard space, the power consumption and the necessary cooling of the system whilst maintaining high safety targets via the redundant design.

Additionally, the system may provide an implementation of a fail-op/fail-safe respectively fail-op/fail-op design for all safety-critical electronic systems/functions of a vehicle (such as a manned air vehicle, UAV, other electronically controlled vehicle as e.g. a car). This is based on a set of redundant vehicle management computers that may be connected to one another.

According to an embodiment of the invention, each vehicle management computer is interconnected with each other vehicle management computer by a separate data link, which may be seen as a cross-channel data link. Via these data links the vehicle management computers may directly exchange data such as generated control and/or maneuvering commands, received sensor data, and/or other information. In case one of these data links fails, it may be possible that the data is communicated indirectly via an intermediate vehicle management computer.

According to an embodiment of the invention, a vehicle management computer is adapted for receiving control commands and/or sensor data from at least one other vehicle management computer and is adapted for comparing control commands and/or sensor data from different vehicle management computers to determine errors of a vehicle management computer. Each vehicle control computer may be adapted for performing a comparison between sensed data and/or control data transmitted via the data links. For example, build-in tests as well as a cross-comparison between the various channels (i.e. data received by different data links) may be performed to detect faulty parts of the system.

In case faulty data and/or a faulty component is detected, the vehicle management computers may perform a reconfiguration based on the failure, for example to ensure that correct control commands are generated for the system actors and/or that correct maneuvering commands are generated such that the control surfaces are moved to correct position even when failures are present. Depending on the number of channels/sensors that are involved in a function, a fail-safe, fail-op/fail-safe or fail-op/fail-op behavior may be achieved for a specific control function.

According to an embodiment of the invention, a first vehicle management computer is directly connected to first system sensors and a second vehicle management computer is directly connected to second system sensors. Directly connected in this context may mean that the data transmitted from the sensor to the vehicle management computer is not transmitted via an intermediate vehicle management computer. However, the sensor may be connected via an interface unit with the vehicle control computer. In the case, both vehicle control computers are operating correctly, the first vehicle management computer may process the data from the first sensor and/or may generate control commands for an actuator associated with the first sensor and the second vehicle management computer may process the data from the second sensor and/or may generate control commands for an actuator associated with the second sensor.

Data received from the first system sensors in the first vehicle management computer may be transmitted by the first vehicle management computer to the second vehicle management computer. For example, when fault control commands generated by the first vehicle management computer are detected, the second vehicle management computer may take over the role of the first vehicle management computer and may generate the control commands for the first actuator.

According to an embodiment of the invention, the system comprises (exactly) two, three, four or more vehicle management computers. Each vehicle management computer may provide a channel of the system. In such a way, the system may be a duplex, triplex or quadruplex redundant system or may have a higher redundancy. The redundant components may be similar (i.e. identically designed) or dissimilar (i.e. differently designed).

According to an embodiment of the invention, a first system sensor and a second system sensor are adapted for acquiring data associated with a specific system actor and/or maneuvering actuator. To provide redundancy with respect to control functions of a system actor and/or maneuvering actuator, more than one sensor may be associated with a specific actuator.

The first system sensor may be connected to a first vehicle management computer and the second system sensor may be connected to a second vehicle management computer. In such a way, even in the case of a complete failure of a vehicle management computer, the respective actuator may be controlled by the other vehicle management computer.

According to an embodiment of the invention, each actuator control computer is interconnected with each other actuator control computer by a separate data link. Similarly to the vehicle management computers, this may provide a fail-safe data communication between the actuator control computers.

According to an embodiment of the invention, an actuator control computer is adapted for receiving maneuvering commands and/or control commands from at least one other actuator control computer and is adapted for comparing the maneuvering commands and/or the control commands from different actuator control computers to determine errors of an actuator control computer or maneuvering actuator. In the case, one actuator control computer detects fault commands and/or detects a failure in one of the other actuator control computers, it may take over the role of the respective actuator control computer. For example, one or all of the actuator control computers may perform a comparison between data transmitted via the data links to determine faulty data.

Like the vehicle management computers, the actuator control computers may perform a reconfiguration based on a failure to ensure that the control surfaces are moved to correct position even when a failure is present. Depending on the number of channels/sensors which are involved in a function, a fail-safe, fail-op/fail-safe or fail-op/fail-op behavior may be achieved for the respective function.

According to an embodiment of the invention, the system comprises two, three or four redundant actuator control computer computers.

According to an embodiment of the invention, at least one redundant computer comprises at least two processing units with different criticality. A vehicle management computer and/or an actuator control computer may comprise a memory, processor and software. They may be implemented as a computer with multiple segregated processing units such that different levels of critical functions may be segregated within one computer.

According to an embodiment of the invention, the system further comprises at least one communication interface to another control computer of the vehicle, wherein the communication interface is directly connected to different vehicle management computers. This may also provide redundancy in the case, one of the vehicle management computers fails. For example, a further control computer may be connected to both communication interfaces. As an example, for a manned vehicle, the pilot's input may be provided to the redundant vehicle management computers via at least two independent channels. As a further example, for an unmanned vehicle, the pilot's commands may be provided by two independent communication links to the redundant vehicle management computers.

According to an embodiment of the invention, another control computer is a mission management system adapted for commanding the system to perform mission relevant maneuvers automatically, like for example following an identified target or flying a search and rescue pattern.

According to an embodiment of the invention, a control computer is a communication system allowing a remote pilot to control and/or monitor the vehicle.

A further aspect of the invention relates to an unmanned aerial vehicle, comprising the system of one of the preceding claims. An unmanned aerial vehicle may be an aircraft (such as a plane or helicopter) without a human pilot on board.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

In principle, identical parts are provided with the same reference symbols in the figures.

DETAILED DESCRIPTION OF EMBODIMENTS

Figure 1:
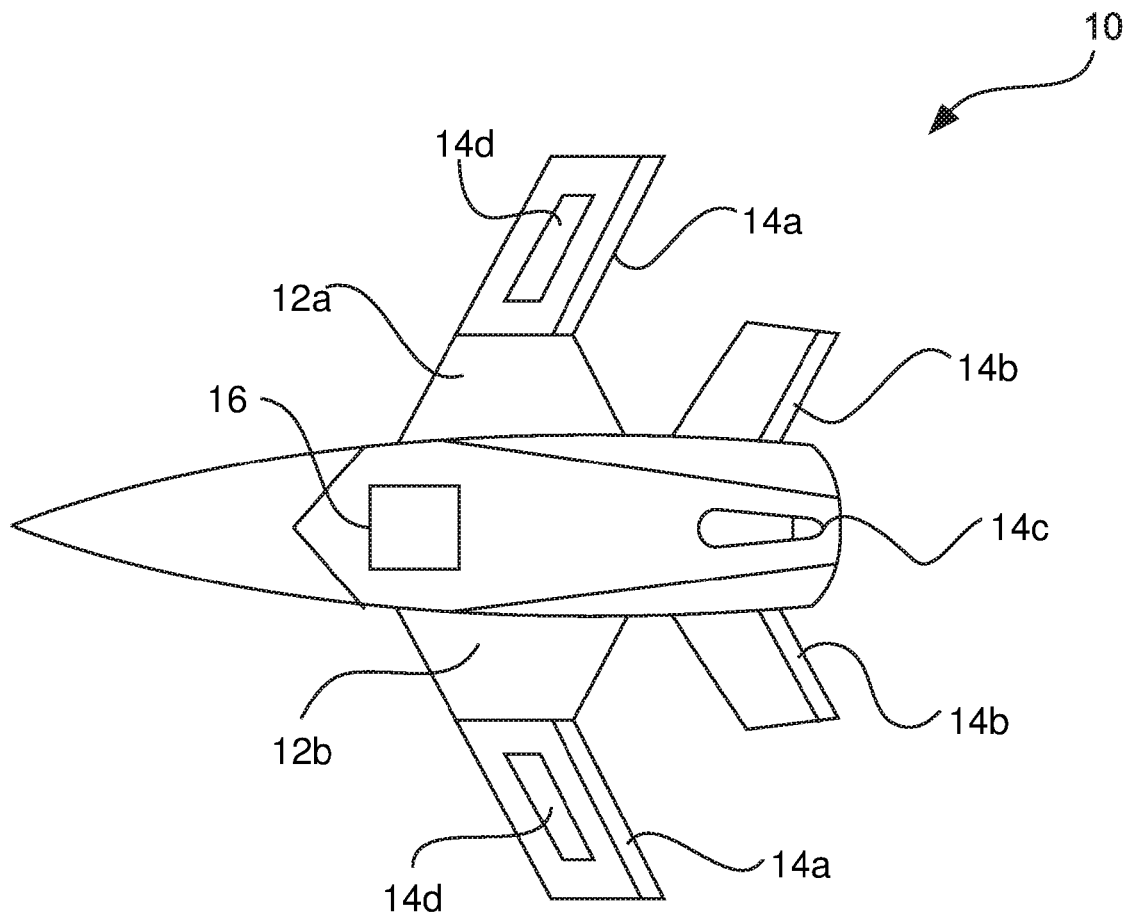
FIG. 1 schematically shows an unmanned aerial vehicle according to an embodiment of the invention.

FIG. 1 shows an unmanned aerial vehicle 10 that is adapted to autonomously fly long distances and perform task without continuous support from a base station. In the illustrated example, the unmanned vehicle 10 is a plane with two wings 12a, 12b. The flight of the unmanned aerial vehicle 10 is maneuvered using a set of primary control surfaces. Usually, these control surfaces comprise a pair of ailerons 14a on the wings 12a, 12b for roll control, a pair of elevators 14b or a single elevator on the tail for pitch control and a rudder 14c on the tail for yaw control. In addition, a set of spoilers 14d may be attached to the wings for speed and roll control.

The unmanned aerial vehicle 10 and the control surfaces 14a, 14b, 14c, 14d are controlled by a control and management system 16, which will be explained with respect to FIG. 2. The following description concentrates on the application within an unmanned aerial vehicle 10 but this does not exclude other vehicle types. For example, the system 16 also may be used for controlling and managing a street vehicle or a watercraft.

The system 16 comprises at least two (here three) vehicle management computers 18a, 18b, 18c, which control the vehicle management functions like system moding, engine control, flight management, autopilot, auto throttle, flight control laws, air data system integration, navigation system integration and health monitoring. In addition, a vehicle management computer 18a, 18b, 18c also controls the system service functions like electrical power supply, environmental control, fuel system control, fire detection control, ice detection and protection control.

Each vehicle management computer 18a, 18b, 18c may be implemented as a single processor computer or as a multiple processor computer. When a multiple processor computer is used and a clear hardware segregation between the processor is present then the various functions may be allocated according to their effect on the aerial vehicle (failure of the function leads to a catastrophic, hazardous, major or minor event) to the different processors thus simplifying the certification process and reducing the development costs.

The vehicle management computers 18a, 18b, 18c are connected to one another with digital data links 20a, 20b, 20c for data exchange that may be called cross-channel data links.

The cross-channel data link may be designed such that they exclude electronic failure propagation. A data link 20a, 20b, 20c may be implemented via a data bus.

The position for the vehicle management computers 18a, 18b, 18c in the vehicle 10 may be chosen, such that the probability of multiple failures in the vehicle management computers 18a, 18b, 18c due to single events is reduced.

Figure 2:
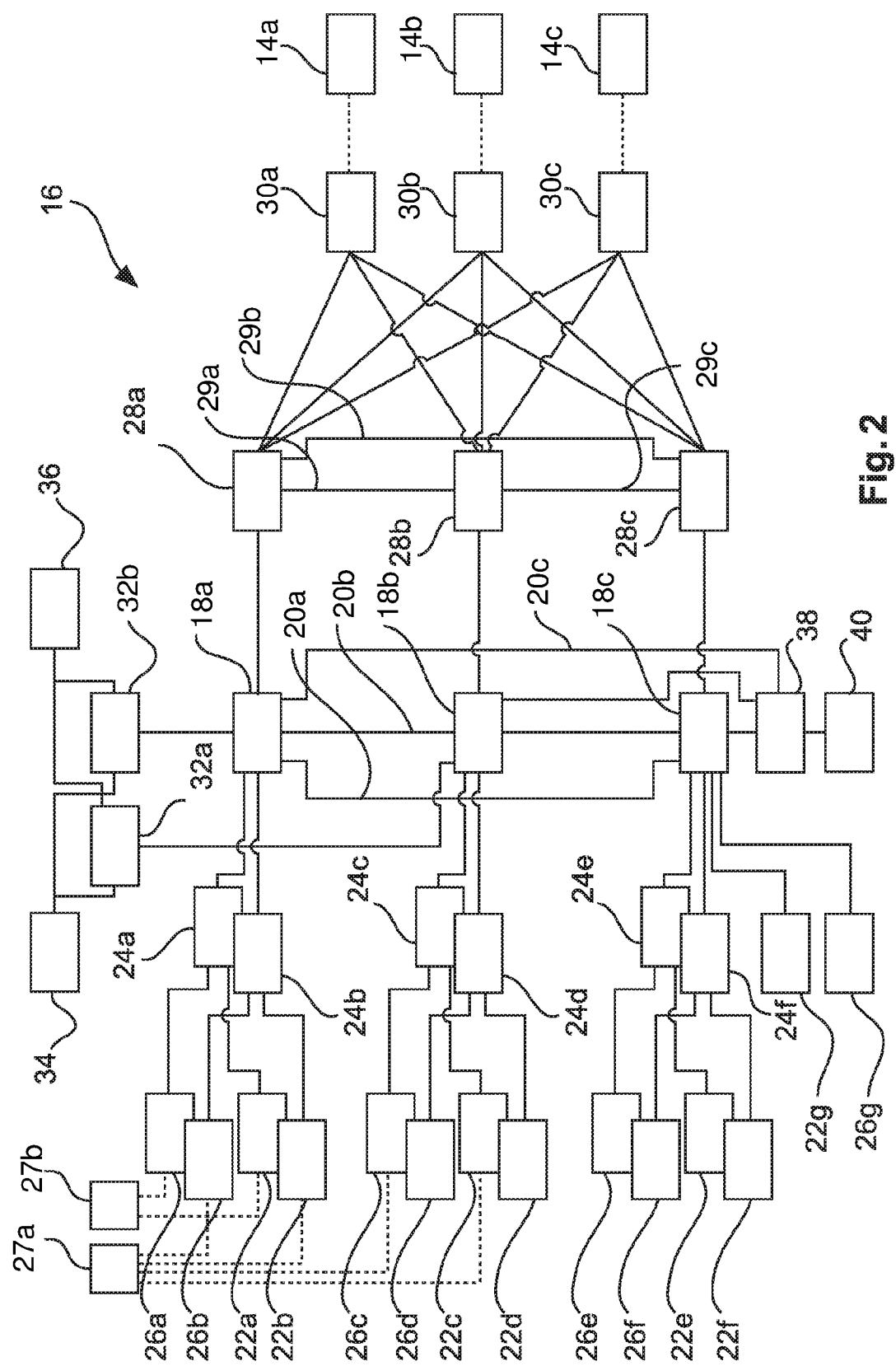
FIG. 2 schematically shows a control and management system according to an embodiment of the invention.

It has to be understood that all continuous lines in the diagram of FIG. 2 may be physical data links that are implemented with electrical lines, for example by a data bus. Analogously, the rectangles interconnected by the continuous lines are physical components of the system that may be mounted to the vehicle 10 at different locations.

Each vehicle management computer 18a, 18b, 18c is connected to sensors, such as system (internal) sensors 22a, 22b, 22c and/or maneuvering (external) sensors 22d, 22e, 22f. A smart sensor 22g (which may be a system sensor or a maneuvering sensor) may be connected directly via a data link (or data bus) to the respective vehicle management computer 18c. Other sensors 22a, 22b, 22c, 22d, 22e, 22f may be connected via a data link (or data bus) to a remote interface unit 24a, 24b, 24c, 24d, 24e, 24f, which may convert analog sensor data to digital data. However, a direct connection without a remote interface unit is also allowed. The remote interface units 24a, 24b, 24c, 24d, 24e, 24f forward the digital data on a further data link (such as a data bus) to the respective vehicle management computer 18a, 18b, 18c.

Depending on the criticality of the sensed data, multiple sensors for the same data are needed. This may be the case for the system sensors 22a and 22c. These system sensors 22a, 22c may be connected to different remote interface units 24a, 24c and these remote interface units 24a, 24c may be connected to different vehicle management computers 18a, 18b such that it is ensured that a failure from one sensor data to the vehicle management computer 18a, 18b cannot cause the loss of the corresponding data of the other sensor.

Each vehicle management computer 18a, 18b, 18c is connected to system actors 26a, 26b, 26c, 26d, 26e, 26f, 26g via a remote interface unit or in a direct way. A smart system actor 26g may be directly connected via a data link (or data bus) to the respective vehicle management computer 18c. Other system actors 22a, 22b, 22c, 22d, 22e, 22f may be connected via a data link (or data bus) to a remote interface unit 24a, 24b, 24c, 24d, 24e, 24f, which may convert digital data (with control commands) to analog data. The remote interface units 24a, 24b, 24c, 24d, 24e, 24f may receive the digital data (control commands) from a further data link (such as a data bus) from the respective vehicle management computer 18a, 18b, 18c.

The remote interface units 24a, 24b, 24c, 24d, 24e, 24f may be placed strategically in the vehicle 10 to minimize the cable length of the system sensors 22a, 22b, 22c, 22d, 22e, 22f and/or the system actors 26a, 26b, 26c, 26d, 26e, 26f, 26g to the remote interface units 24a, 24b, 24c, 24d, 24e, 24f. The remote interface units 24a, 24b, 24c, 24d, 24e, 24f may also be placed at locations in the vehicle 10 to reduce the probability of multiple failures due to single events, for example battle damage.

Each vehicle management computer 18a, 18b, 18c may be adapted to generate control commands for all system actors 26a, 26b, 26c, 26d, 26e, 26f, 26g based on the sensed data received by one or more system sensors 22a, 22b, 22c, 22d, 22e, 22f, 22g.

The system sensors 22a, 22b, 22c, 22d, 22e, 22f, 22g may, for example, measure a position, state, current etc, such as a temperature, a status of an inner component 27a, 27b, such as a pump, a position of a valve or a relay. A system actor 26a, 26b, 26c, 26d, 26e, 26f, 26g may switch on/off an inner component 27a, 27b, such as a pump, open/close a valve or a relay, etc.

A vehicle management computer (for example 18c) may send the sensed data received via the remote interface units 24e, 24f or directly from a system sensor 22g to the other vehicle management computers 18a, 18b via the data links 20a, 20b, 20c. The vehicle management computers 18a, 18b, 18c may monitor the health state of the system sensors 22a, 22b, 22c, 22d, 22e, 22f, 22g and the data links used for the data transfer between the system sensors 22a, 22b, 22c, 22d, 22e, 22f, 22g and the vehicle management computers 18a, 18b, 18c to determine the health state of the sensed data.

Each vehicle management computer 18a, 18b, 18c may implement a voter on redundant data to determine a consolidated value of the remaining healthy sensed data. In addition, a cross-comparison between the sensed data and the voted data may be performed to detect faulty sensor data which is not detected by the internal built-in test functions.

Based on the health state of the system sensors 22a, 22b, 22c, 22d, 22e, 22f, 22g and/or system actors 26a, 26b, 26c, 26d, 26e, 26f, 26g, the vehicle management computers 18a, 18b, 18c may determine how the different subsystems of the vehicle management system and the system services implemented in the vehicle management computers 18a, 18b, 18c may have to be adapted. The vehicle management computers 18a, 18b, 18c may send the relevant actions like opening/closing a valve, enabling/disabling a pump, energizing/de-energizing an actuator, shutting down an engine to the at least one remote interface unit which is connected to the relevant actuator 26a, 26b, 26c, 26d, 26e, 26f, 26g.

The same may happen when the vehicle management computers 18a, 18b, 18c determine that the system state may have to be changed due to the current flight condition like, for example, lowering the landing gear during approach, adapting the throttle setting when icing conditions are detected.

Furthermore, the system 16 comprises at least two (here three) actuator control computers 28a, 28b, 28c that are communicatively interconnected with the vehicle management computers 18a, 18b, 18c. In particular, each actuator control computer 28a, 28b, 28c is connected via a data link 29a, 29b, 29c with one of the vehicle management computers 18a, 18b, 18c. The vehicle management computers 18a, 18b, 18c are adapted for generating maneuvering commands to be sent to the actuator control computers 28a, 28b, 28c, which then control the control surfaces 14a, 14b, 14c, 14d.

The actuator control computers 28a, 28b, 28c are connected to maneuvering actuators 30a, 30b, 30c (such as hydraulic cylinders) and are adapted to control these actuators 30a, 30b, 30c via maneuvering commands received from the vehicle management computers 18a, 18b, 18c. As indicated by the dotted lines, the actuators 30a, 30b, 30c are adapted to move the control surfaces 14a, 14b, 14c based on the control commands received from the actuator control computers 28a, 28b, 28c.

In order to reduce the overall weight of the aerial vehicle 10, each of the control surfaces 14a, 14b, 14c, 14d may be attached to a single high integrity actuator 30a, 30b, 30c. Each actuator 30a, 30b, 30c may be controlled by a set of independent valve motors (denying or opening access to a hydraulic cylinder) and/or may reports its piston position by one or more independent sensors and/or its valve position by one or more independent sensors.

The actuator control computers 28a, 28b, 28c may receive control surface position commands or actuator position commands (i.e. maneuvering commands) for all control surfaces 14a, 14b, 14c, 14d and/or actuators 30a, 30b, 30c from the connected vehicle management computer 18a, 18b, 18c. Each actuator control computer 28a, 28b, 28c may be connected to one motor, one ram position sensor and one valve position sensor of each actuator 30a, 30b, 30c.

An actuator control computer 28a, 28b, 28c may send the corresponding data (control commands for an actuator) to the other actuator control computers 28a, 28b, 28c. Each actuator control computer 28a, 28b, 28c may comprise a monitor for detecting faulty position sensors or faulty motors. A voter may generate the consolidated view of the positions based on the healthy signals.

Each actuator control computer 28a, 28b, 28c may send the received piston and/or control surface position command to the other actuator control computers. A voter may generate the consolidated view of the requested position command.

The actuator control computers 28a, 28b, 28c may perform a loop closure between the requested piston and/or control surface position control command and the respective piston and/or control surface position sensor data and may generate the required valve position command. The actuator control computers 28a, 28b, 28c may perform a loop closure between the valve position control command and the valve position sensor data and may send the corresponding command to the connected motor of the actuator 30a, 30b, 30c.

An actuator control computer 28a, 28b, 28c may perform a health monitoring of the respective actuators 30a, 30b, 30c and the other actuator control computers 28a, 28b, 28c. When a failure is isolated, then the corresponding motor of the actuator 30a, 30b, 30c may be de-energized.

The position for the actuator control computers 28a, 28b, 28c in the vehicle also may be chosen, such that the probability of multiple actuator control computer failures due to single events is reduced.

Potentially critical parts of the system 16 like the vehicle management computers 18a, 18b, 18c and/or the actuator control computers 28a, 28b, 28c may be connected to two different electrical bus bars to ensure that they are still working after power generation failures.

The system 16 may comprise at least two communication interfaces 32a, 32b that are redundantly connected to two different vehicle management computers 18a, 18b. Other systems 34, 36 of the vehicle 10 may be connected via these interfaces 32a, 32b to the system 16.

For example, potentially non-critical functions like a mission management system 34 and/or a communication system 36 may be connected to the vehicle management computers 18 via the communication interfaces 32a, 32b.

The mission management system 34 may command the system 16 to perform mission relevant maneuvers automatically like for example following an identified target or flying a search and rescue pattern.

The communication system 36 may allow a remote pilot to control and monitor the vehicle 10.

The system also may comprise a common interface 38 for communication with a ground control computer 40 that may be connected to the vehicle 10, when the vehicle 10 is at its base station. The common interface 38 may be connected to each of the vehicle management computers via a separate data link.

For example, during flight or during a mission, the vehicle management computers 18a, 18b, 18c may command the health monitoring functions in all equipment of the system 16 apart from the actuators. The vehicle management computers 18a, 18b, 18c may collect all results of the health monitoring.

On ground or after the mission, it is possible to connect the ground control computer 40 to at least two of the vehicle management computers 18a, 18b, 18c via the common interface 38, for example with a data bus or network link. The ground control computer 40 is then used to retrieve the data from the health monitoring storage of the vehicle management computers 18a, 18b, 18c to support the maintenance of the vehicle 10. The ground control computer 40 may also start maintenance related tests of the system 16. During these tests, the vehicle management computers 18a, 18b, 18c may continuously report the progress of the test as well as the current test status.

The system may comprise a different number of pairs of a vehicle management computer 18a, 18b, 18c and an actuator control computer 28a, 28b, 28c.

Using a duplex approach (i.e. two of the vehicle management computers 18a, 18b, 18c and two actuator control computers 28a, 28b, 28c) may result in a fail-safe design.

Using a triplex approach (i.e. three vehicle management computers 18a, 18b, 18c and three actuator control computers 28a, 28b, 28c) as shown in FIG. 2 may result in an at least fail-op/fail-safe design. With a good failure detection rate of the built-in test functions of the equipment, it might also provide a fail-op/fail-op design.

Using a quadruplex approach (i.e. four vehicle management computers 18a, 18b, 18c and four actuator control computers 28a, 28b, 28c), a fail-op/fail-op design may be achieved.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE NUMERALS 10 unmanned aerial vehicle
12a, 12b wings
14a aileron
14b elevator
14c rudder
14d spoiler
16 system
18a, 18b, 18c vehicle management computer
20a, 20b, 20c data link
22a, 22b, 22c system sensor
22d, 22e, 22f, 22g maneuvering sensor
24a, 24b, 24c remote interface unit
24d, 24e, 24f remote interface unit
26a, 26b, 26c (system) actor
26d, 26e, 26f, 26g (system) actor
27a, 27b inner component of vehicle
28a, 28b, 28c actuator control computer
29a, 29b, 29c data link
30a, 30b, 30c (maneuvering) actuator
32a, 32b communication interface
34 mission management system
36 communication system
38 common interface
40 ground control computer

The invention claimed is:

1. A control and/or management system for a vehicle, the system comprising:
maneuvering actuators configured to maneuver the vehicle;
system actors configured to control inner system components of the vehicle;
sensors configured to acquire data associated with the system actors or maneuvering actuators; and
at least two redundant computers configured to control or manage the vehicle,
wherein the system further comprises at least one of
at least two redundant vehicle management computers communicatively interconnected with the maneuvering actuators, system actors, and sensors, wherein one of the at least two redundant vehicle management computers is configured to generate system control commands for each maneuvering actuators and for each system actor based on the data acquired by the sensors, wherein one of the at least two redundant vehicle management computers is configured to receive control commands or sensor data from at least one other vehicle management computer and is configured to compare control commands or sensor data from different vehicle management computers to determine errors of a vehicle management computer, wherein a first one of the at least two redundant vehicle management computer is directly connected to a first sensor and a second of the at least two redundant vehicle management computer is directly connected to a second sensor, wherein data received from the first sensor in the first vehicle management computer is transmitted by the first vehicle management computer to the second vehicle management computer, wherein, in the case both vehicle management computers are operating correctly, the first vehicle management computer is configured to process the data from the first sensor and/or to generate control commands for an actuator associated with the first sensor, and the second vehicle management computer is configured to process the data from the second sensor and/or to generate control commands for an actuator associated with the second sensor, wherein the first vehicle management computer is configured to transmit data received from the first sensor in the first vehicle management computer to the second vehicle management computer, and wherein, when fault control commands generated by the first vehicle management computer are detected, the second vehicle management computer is configured to take over the role of the first vehicle management computer and to generate the control commands for the first actuator.

2. The system of claim 1, wherein each vehicle management computer is interconnected with each other vehicle management computer by a separate data link.

3. The system of claim 1, wherein it is provided:
at least two redundant actuator control computers configured to receive maneuvering commands from the at least two vehicle control computers, wherein each actuator control computer is adapted to generate control commands for each maneuvering actuator based on received maneuvering commands.

4. The system of claim 3, wherein one of the at least two redundant actuator control computers is configured to receive maneuvering commands or control commands from at least one other actuator control computer and is configured to compare the maneuvering commands or the control commands from different actuator control computers to determine errors of an actuator control computer or maneuvering actuator.

5. The system of claim 1, wherein at least one of the at least two redundant computers comprises at least two processing units with different safety criticality.

6. The system of claim 1, wherein
the maneuvering actuators are configured to move control surfaces, or
a control surface moved by a maneuvering actuator is provided by at least one of an aileron, an elevator, and a rudder.

7. The system of claim 1, further comprising:
at least one communication interface to at least one control computer of the vehicle,
wherein the communication interface is directly connected to different vehicle management computers.

8. The system of claim 7, wherein a control computer is a mission management system configured to command the system to automatically perform mission relevant maneuvers.

9. The system of claim 7, wherein the at least one control computer is a communication system allowing a remote pilot to control or monitor the vehicle.

10. The system of claim 1, wherein the vehicle is an unmanned aerial vehicle.

11. The system of claim 1, wherein it is provided:
at least two redundant remote interface units configured to interconnect a sensor or a system actor with the at least two vehicle management computers.

12. The system of claim 3, wherein each of the at least two redundant actuator control computers is interconnected with each other actuator control computer by a separate data link.

13. The system of claim 1, wherein it is provided:
a common interface, wherein the common interface is directly connected to at least two redundant computers.

* * * * *